United States Patent
Rolfes

(10) Patent No.: US 6,240,831 B1
(45) Date of Patent: Jun. 5, 2001

(54) BREWING COMPLETION INDICATOR

(76) Inventor: Patrick J. Rolfes, 2006 Seadrift Dr., Corona Del Mar, CA (US) 92625

( * ) Notice: Subject to any disclaimer, the term of this patent is extended or adjusted under 35 U.S.C. 154(b) by 0 days.

(21) Appl. No.: 09/574,018

(22) Filed: May 19, 2000

(51) Int. Cl.[7] .................................................. A47J 31/00
(52) U.S. Cl. .................................. 99/285; 99/279; 99/280
(58) Field of Search .............................. 99/285, 280, 281, 99/282, 283, 290, 279; 340/584, 586, 309.15, 588, 691.6

(56) References Cited

U.S. PATENT DOCUMENTS

| | | | |
|---|---|---|---|
| 4,412,487 | * 11/1983 | Oota et al. ............................... | 99/280 |
| 4,857,758 | * 8/1989 | Rigazio et al. .................... | 99/285 X |
| 5,063,836 | 11/1991 | Patel ....................................... | 99/281 |
| 5,404,794 | 4/1995 | Patel et al. .............................. | 99/280 |
| 5,549,035 | * 8/1996 | Wing-Chung ........................... | 99/281 |
| 5,836,236 | 11/1998 | Rolfes et al. ........................... | 99/290 |
| 5,875,703 | 3/1999 | Rolfes ..................................... | 99/283 |

* cited by examiner

*Primary Examiner*—Reginald L. Alexander
(74) *Attorney, Agent, or Firm*—Gordon K. Anderson

(57) ABSTRACT

A brewing completion indicator for a commercial coffee brewer that operates by receiving a signal from the brewer (20) and energizes an indicator (32) when it is safe to remove the brew cone or filter basket. In the past commercial brewers simply light an indicator when the brewing cycle is completed which may be dangerous as the hot water and steam may still be present and create a hazard. The invention precludes this problem by adding a time delay that permits sufficient time to pass until it is safe to remove the coffee grounds and filter in the brew cone. As brewers vary in capacity and utilize various types of coffee the apparatus is adjustable in the duration of time. Further the invention may be used in conjunction with existing solid state control systems already in the brewer or may be separate device that is added to the brewer as a separate component.

14 Claims, 2 Drawing Sheets

BREWING COMPLETION INDICATOR

TECHNICAL FIELD

The present invention relates to indicators in general. More specifically to an indicator for a commercial coffee brewer to verify when it is safe to remove the brew cone containing a filter and coffee grounds.

BACKGROUND ART

Previously, many types of indicators have been used in endeavoring to provide visual indication of a particular process used with coffee brewing apparatus. The prior art located by the inventor was silent relative to the premature removal of the brewing cone or filter basket before it has had time to cool down to a reasonable temperature.

A search of the prior art did not disclose any patents that read directly on the claims of the instant invention, however the following U.S. patents are considered related:

| U.S. Pat. No. | Inventor | Issue Date |
| --- | --- | --- |
| 5,875,703 | Rolfes | Mar. 2. 1999 |
| 5,836,236 | Rolfes et al. | Nov. 17, 1998 |
| 5,404,794 | Patel et al. | Apr. 11, 1995 |
| 5,063,836 | Patel | Nov. 12, 1991 |

Rolfes own U.S. Pat. No. 5,875,703 teaches an improvement on a coffee brewer and hot water dispenser which permits larger capacity by the use of a bypass hot water cycle adding a predetermined volume of water to the container and supplementing the control by expanding its capabilities using multiple sequencing of the brew cycle for increasing the volume of brewed coffee. No brewing completion indication is taught in this prior art.

U.S. Pat. No. 5,836,236 issued to Rolfes et al., in which the first named inventor is the present inventor, discloses a coffee brewer and hot water dispenser which brews both coffee and also dispensed hot water from a separate system. The invention discloses a brewer with a solid state electronic control that includes all of the necessary functions to brew coffee however when the brewing is completed the system de-energizes and a green ready light is illuminated with no further indication made.

U.S. Pat. No. 5,404,794 of Patel et al. discloses a coffee making machine having a reservoir connected to an external water supply via a valve which divides the water into separate hot and cold water tanks. Heated water from a boiler is fed into an expansion chamber and then discharged into the ground coffee through a spray head at the end of an expansion chamber. The enclosure is made of a pair of laterally spaced rectangular arms forming a base with a column located at one end which basically houses most of the operating parts of the coffee-making machine. Nothing specific is taught about any delay after the brewing cycle is completed.

Patel in U.S. Pat. No. 5,063,836 teaches a coffee making machine of the type adapted to be connected to city water supply. The device includes a reservoir having a level sensor controlling a water refill valve to the reservoir and a heating element which heats the water therein. A level sensor functions to permit automatic refill of the reservoir at the appropriate level for subsequent brewing of a full pot of coffee irrespective of the water pressure and the previous route of the water. A solid state circuit board controls the operational sequence and functions of the machine. The device includes a base with a warming plate on which a coffee pot may rest and columns upon which most of the operating components are mounted. This patent is also void of any mentioning any further delay in time after the brewing cycle is completed.

DISCLOSURE OF THE INVENTION

In the past commercial coffee brewers are designed to have some type of brewing cycle automatically programmed in an integral solid state controller system or it has the necessary relays and thermostats in an electro-mechanical type brewer. At any rate the brewers that are in common use today usually indicate, in some manner, that the brewing cycle has been completed and the coffee is ready. The problem that has arisen is that although the cycle is actually finished the hot water and steam that have been introduced into the brew cone, or filter basket, may still contain the residual heat of the water and steam in the grounds and filter. It is even possible that sometimes the water is still passing through the coffee grounds and there is nothing to warn the user that it may not be safe to remove the cone until the final procedure is fully completed. It is therefore a primary object of the invention to add to a brewing completion indicator that visually or audibly indicates that although the brewing cycle is actually finished it is not safe to handle or remove the brew cone until indicated. The preferred embodiment of the invention operates by energizing a light emitting diode (LED) during the extended period and when it is turned off it signals the user that the cycle is now totally completed.

Another object of the invention is that the indication may not only be a signal light but an audible sound such as a horn or buzzer or some other physical manifestation. In actuality the signal may be almost any type of indication that is known in the art and available to the public.

An important object of the invention is that the apparatus may be incorporated into existing equipment or it may be a separate device that is added to an existing brewer as a detached element that is installed at a later time. If the invention is built in it to the brewer it may share the same electronic circuit and even the same indicator lights. As an example if the apparatus is incorporated into the inventors previous commercial coffee brewer that is protected by U.S. Pat. No. 5,836,236, the solid state circuit may be incorporated on the same printed circuit board also share the same power supply and indicating lights.

Still another object of the invention is that the brewing completion indicator includes a method of easily adjusting the delay time. This feature is important as each style of coffee brewer has a different time interval characteristic which is governed by the amount or volume of coffee being brewed and the actual type of coffee. As an example in a brewer handling say 50 fluid ounces (1.5 liters) of water, when conventional coffee is used the normal amount of grounds required is around 1 ounce (28.3 grams) which requires some 15 to 20 seconds to cool down whereas, in the same brewer, when the so called specialty coffee is used the amount of grounds may be increased as much as 2½ times which obviously has an effect on the amount of time required to cool which may be over a minute. Some very large brewers may take even as much as 2 to 3 minutes to cool down therefore the system must be easily adjustable. The invention does just that as a manually adjustable potentiometer is mounted on a printed circuit board and the adjusting wheel is easily accessible with clockwise rotation increasing the time and counterclockwise rotation providing just the opposite action. It should be noted that when the invention is built into the brewer by the original equipment manufacturer the timing is pre-set to the optimum time duration at the factory for standard type coffee.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
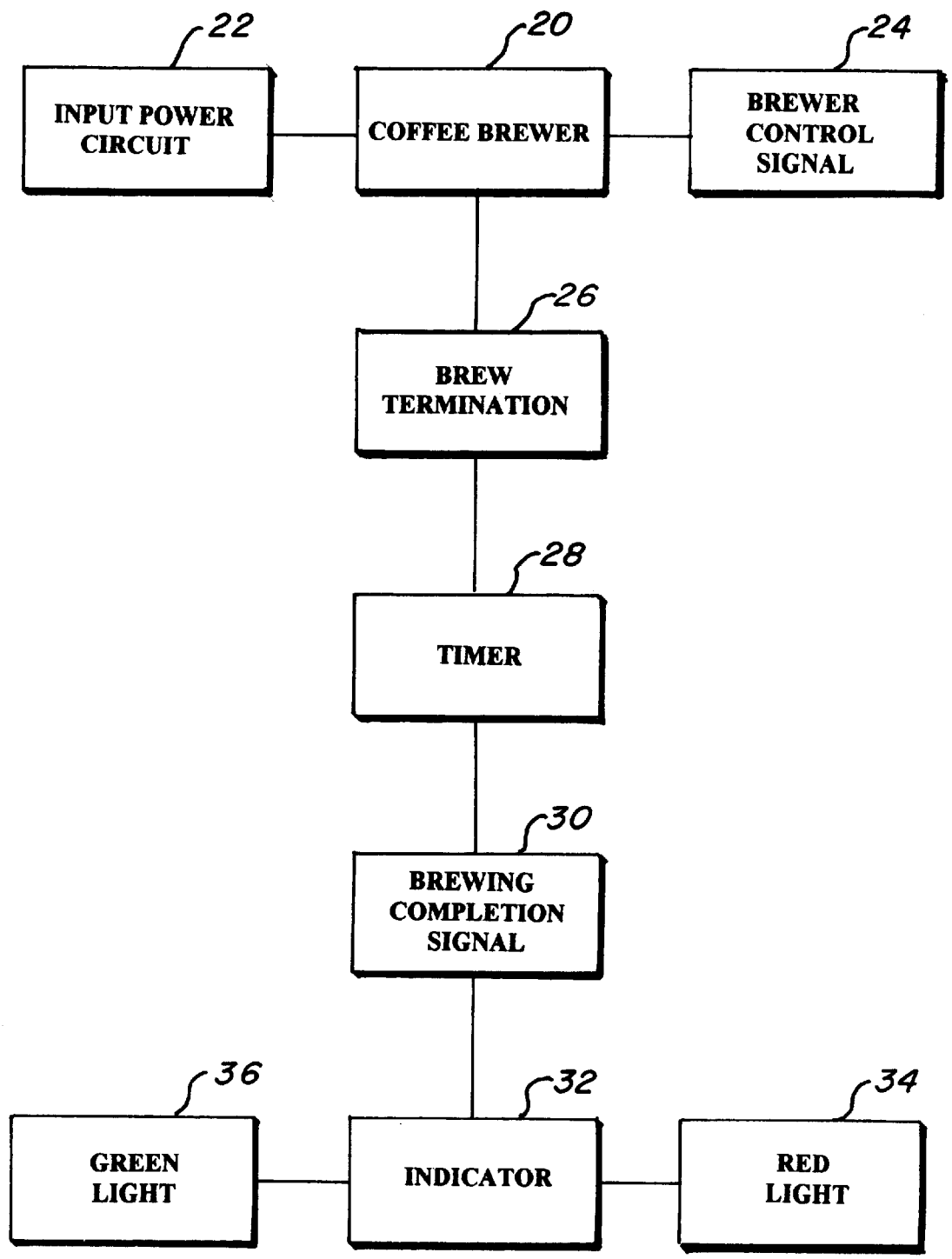
FIG. 1 is a block diagram of the preferred embodiment.
Figure 2:
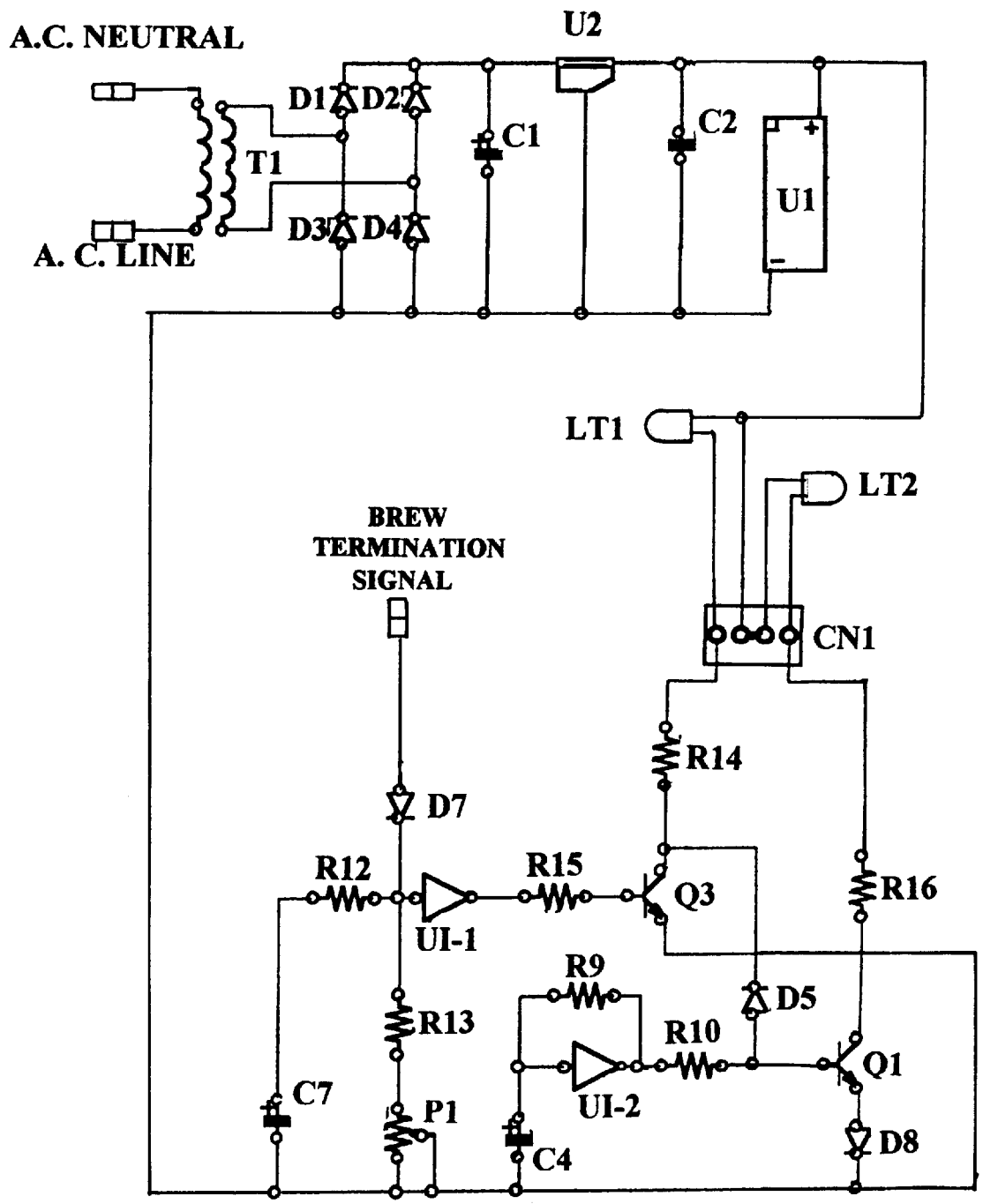
FIG. 2 is an electrical schematic diagram of the preferred embodiment.

The best mode for carrying out the invention is presented in terms of a preferred embodiment. This preferred embodyment is shown in FIGS. 1 and 2 and is comprised of a commercial coffee brewer 20 of the type that is automatic in that the brewing cycle is operated by solid state controls or even electro-mechanical controls that complete the brewing cycle without human intervention. The brewer 20 may also be of the type that is connected to a city water supply or may be the pour-over type that requires that cold water be poured into the brewer to start the brewing cycle. In either event the brewer 20 must be connected to a source of electric power preferably 115/230 volt single phase 50/60 hertz which hereafter may be designated as the input power circuit 22 which ultimately powers the indicator. In order for the invention to function the brewer must produce a brew termination signal 24 which may be any electrical output circuit that is energized or de-energized at the completion of the brewing cycle. As illustrated in the drawing FIG. 2 the signal 24 is preferably a nominal 6 volt D.C. positive connection that is part of the solid state controls of the brewer producing current flow when the brewing cycle is complete which may be designated as brew termination 26.

The balance of the system consists basically of a timer 28 that is adjustable in duration and permits signaling the user to be warned that even though the brewing is completed it is not yet safe to remove the brew cone. The timer 28 in the preferred embodiment is shown schematically in FIG. 1 and is illustrated in the self contained configuration for convenience. A description of this schematic is in order to understand the functioning of the timer and its ancillary equipment. The input power circuit 22 is designated as A.C. NEUTRAL and A.C. LINE and in this embodiment is 115 volt single phase 60 hertz. The power is then introduced to a transformer T1 which reduces its voltage and is then inverted into direct current using a conventional Wheatstone Bridge with resistors D1 through D4 having an output of 6 volts D.C. voltage regulators U1 and U2 along with capacitors C1 and C2 maintain the desired voltage. It will be noted that if the invention is used in conjunction with the existing solid state controls of the brewer in which the device has been incorporated, tis circuit in not duplicated but shared with the existing equipment of the system. In either event the timer 28 operates on variable voltage with a base of 6 volt D.C. with the system operating when the brew termination signal 26 is receive from the brewer 20. The timing portion of the system uses a capacitor discharge in conjunction with a Schmidt trigger and an adjustable potentiometer, with switching accomplished transistor.

The brewing completion signal 30 in the preferred embodiment is an indicator 32 in the form of a pair of lights with a red light 34 indicating that the brewing is not completed and a green light 36 that is energized visually showing that brewing is entirely finished and the brewer is in the ready condition waiting for the next brewing cycle to commence. In this embodiment the lights 34 and 36 are light emitting diodes and again they are already present in the electronics of the brewer 20. For discrete component applications these lights 34 and 36 are added to the control panel.

The lights are designated LT1 for the green "ready" light and LT2 for the red "brewing" light. It is common in the industry and easily understood by the user that the brew light LT2 oscillates continuously on and off to draw attention to the functioning of the brewer therefore a pulsating circuit is provided. This oscillation is provided by the use of a capacitor driven integrated circuit with transistor switching designated in the schematic of FIG. 2 as capacitor C4, integrated circuit UI-2 and resistor Q1 also resistors R9 and R10 along with blocking diodes D5 and D8.

It is favored to use LED's however, as indicated previously, that nay type of indicator 32 may be used, including incandescent or other lamps as well as audible enunciators. Further it is within the scope of the invention to use only one light on simple applications of the pour-over type of brewer where little control is necessary.

To define the schematic input power 22 is introduced to the system through the A.C. LINE to the line side of the transformer T1 and also A.C. NEUTRAL to the other line connection of the transformer. The load side of the transformer on the neutral side is connected to the rectifying bridge diodes D1 and D3 and on the line side to diodes D2 and D4. The cathode of D1 and D2 is connected to the voltage regulator U1 which incorporates capacitors C1 and C2 also U2. The positive side of the regulator U1 feeds the light emitting diodes LT1 and LT2 through terminal block CN1. The brew termination signal 26 feeds the capacitor C7 through diode D7 and resistor R12. Diode D7 on the cathode side also introduces voltage to integrated circuit UI-1 and potentiometer P1 through resistor R13. The output side of UI-1 is connected to the base of resistor Q3 through resistor R15. The collector of Q3 creates a circuit to light LT1 through resistor R14. The emitter of transistor Q3 is connected to the negative side of the D.C. power supply. The oscillation portion of the system receives positive power from the collector of Q3 and connects to both integrated circuit UI-2 and capacitor C4 through resistor R10 and R9 in series for the capacitor C4 only. Further the same positive line is feeds the base of transistor Q1. The collector of Q1 energizes the light LT2 through resistor R16 and the emitter is connected to the negative side of the power supply through diode D8.

While the invention has been described in complete detail and pictorially shown in the accompanying drawings, it is not to be limited to such details, since many changes and modifications may be made in the invention without departing from the spirit and scope thereof. Hence, it is described to cover any and all modifications and forms which may come within the language and scope of the appended claims.

BREWING COMPLETION INDICATOR

Element Designation (For convenience of the examiner, not part of the specification)

20 coffee brewer
22 input power circuit 24 brew termination signal
26 brew termination
28 timer
30 brewing completion signal
32 indicator
34 red light
36 green light

What is claimed is:

1. A brewing completion indicator for a coffee brewing device comprising:

a commercial coffee brewer having solid state electronic controls, producing a brew termination signal at its completion of a brewing cycle, a solid state timer actuated by said brew termination signal, said timer producing a brewing completion signal, and an indicator energized by said brewing completion signal indicating that a brewing cycle requires an extended duration before it is safe to remove the coffee brewers brew cone.

2. The brewing completion indicator as recited in claim 1 wherein said coffee brewer is connected to a city water supply.

3. The brewing completion indicator as recited in claim 1 wherein said coffee brewer is the pour over type.

4. The brewing completion indicator as recited in claim 1 wherein said brew termination signal is essentially 6 volt D.C. and is integral with the brewers solid state electronic controls.

5. The brewing completion indicator as recited in claim 1 wherein said timer further comprises solid state controls.

6. The brewing completion indicator as recited in claim 1 wherein said timer further comprises adjustable timing duration to accommodate a specific requirement of type and volume of coffee being brewed and physical capacity of the brewer.

7. The brewing completion indicator as recited in claim 1 wherein said timer is completely self contained and depends only on an external power source for complete operation.

8. The brewing completion indicator as recited in claim 1 wherein said timer is an integral part of brewers solid state electronic controls and shares its same power source.

9. The brewing completion indicator as recited in claim 1 wherein said timer completion signal is a blinking 6 volt D.C. circuit connected to a colored light emitting diode that continues to flash at regular intervals until de-energized when it is safe to remove the brewers brewing cone.

10. The brewing completion indicator as recited in claim 1 wherein said indicator is a light emitting diode.

11. The brewing completion indicator as recited in claim 1 wherein said indicator is an incandescent lamp.

12. The brewing completion indicator as recited in claim 1 wherein said indicator is an audible enunciator.

13. A brewing completion indicator for a commercial coffee brewer comprising:

a commercial coffee brewer having solid state electronic controls, producing a brew termination signal at its completion of a brewing cycle, a solid state timer integral with the coffee brewers controls, actuated by said brew termination signal, said timer producing a brewing completion signal, and an indicator energized by said brewing completion signal replacing a brewer electronic control continuing to indicate that a brewing cycle is not yet complete until an extended period has passed until it is safe to remove the coffee brewers brew cone.

14. A brewing completion indicator for a commercial coffee brewer comprising:

a coffee brewer producing a brew termination signal at its completion of a brewing cycle, a solid state timer actuated by said brew termination signal, producing a brewing completion signal, and an indicator energized by said brewing completion signal indicating that a brewing cycle requires an extended duration before it is safe to remove the coffee brewers brew cone.

* * * * *